Patented June 16, 1931

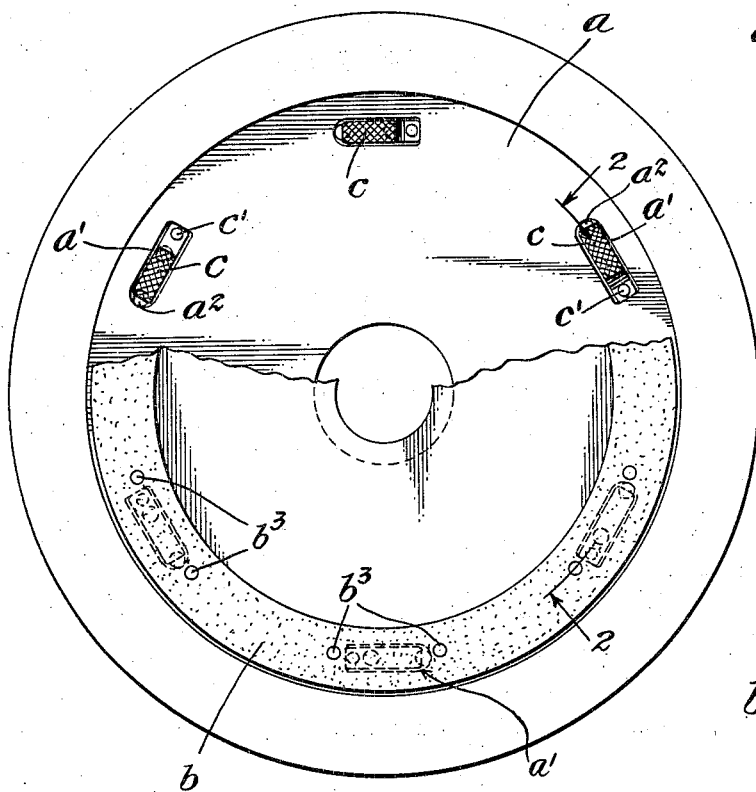
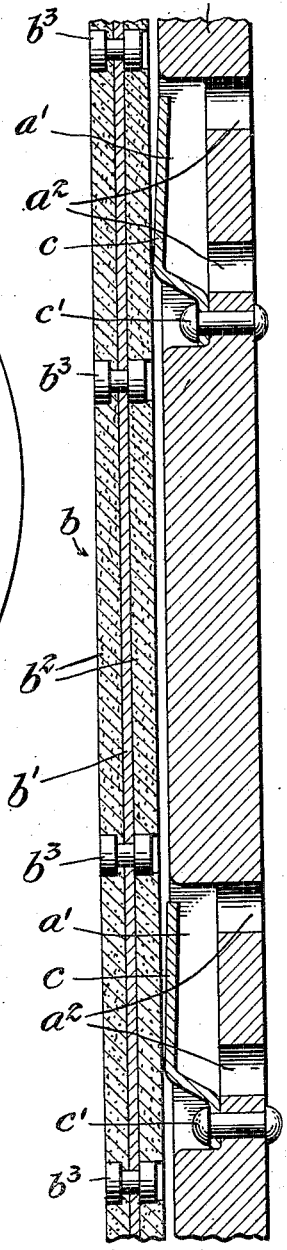

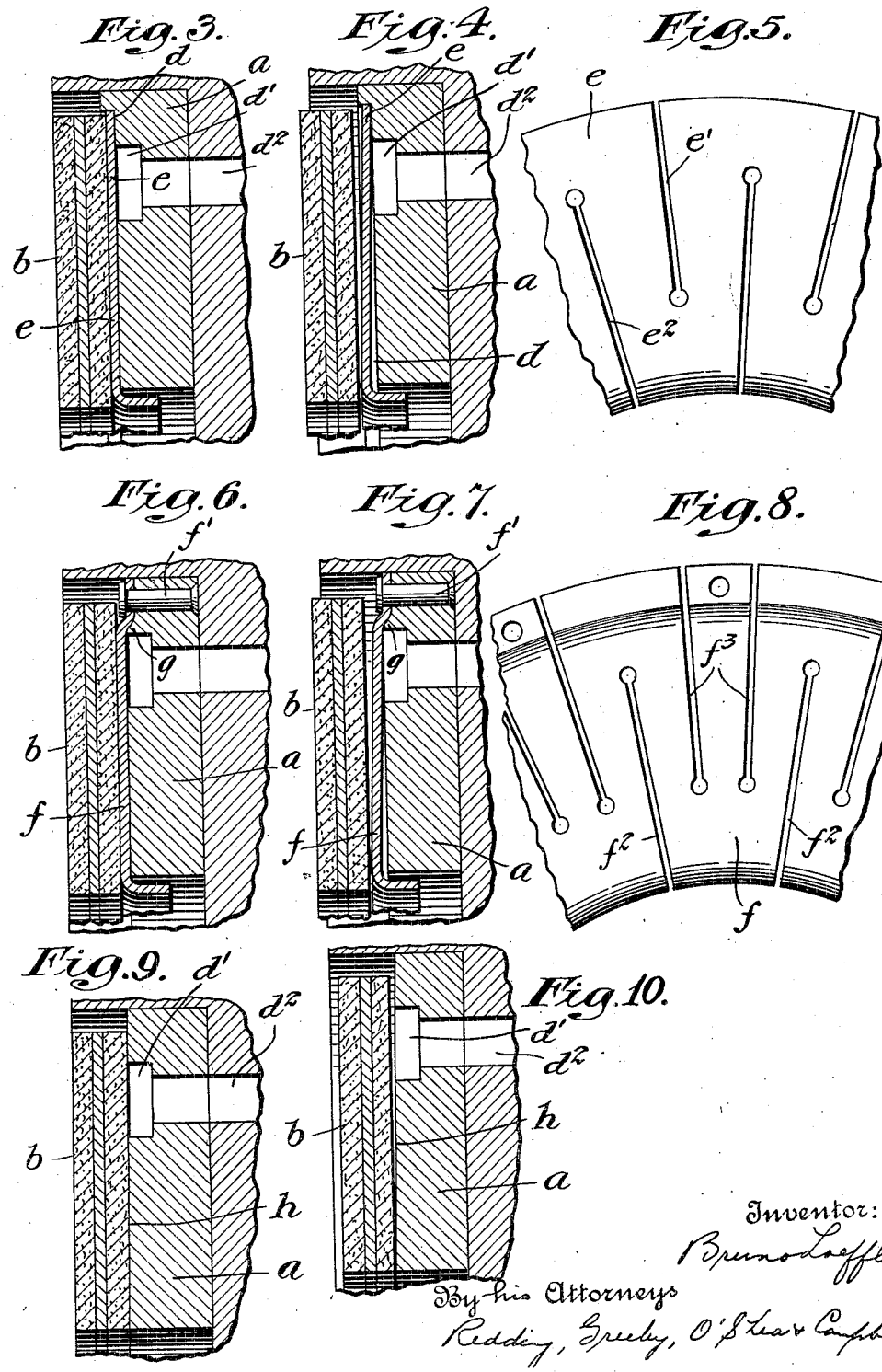

1,810,361

UNITED STATES PATENT OFFICE

BRUNO LOEFFLER, OF PLAINFIELD, NEW JERSEY, ASSIGNOR TO INTERNATIONAL MOTOR COMPANY, OF NEW YORK, N. Y., A CORPORATION OF DELAWARE

CLUTCH DISK CONSTRUCTION

Application filed September 12, 1929. Serial No. 392,078.

The present invention relates to clutches and embodies, more specifically, an improved clutch disk construction which is constructed to afford a more uniform and positive engagement of the relatively rotating portions of the clutch.

A common fault with many clutches constructed in accordance with present designs is that the relatively rotating members frequently engage with a jerk, or a catching which impresses violent strains upon the transmission and associated driving mechanism, at the same time resulting in highly uncomfortable operation, from the passenger's standpoint, when the clutch is used in motor vehicle service. The difficulty of providing a smooth engagement frequently arises from the fact that the contacting surfaces of the plates and friction disks can not be made absolutely uniform in character and certain portions of such surfaces are, in this manner, not able to come into full use during the engagement of the clutch.

The present invention embodies a clutch which is designed to afford, not only a positive and effective engagement of the relatively rotating portions thereof, but the design is such that this engagement takes places in a smooth manner, free from all jerking and catching, such as frequently experienced in existing forms of clutches.

An object of the invention, therefore, is to provide a clutch, the elements of which are so designed that engagement thereof takes place without jerking or catching.

A further object of the invention is to provide a clutch construction in which the area of contact between relatively rotating portions thereof increases gradually during the engaging operation of the clutch.

A further object of the invention is to provide a clutch of the above character, the elements of which are simple in construction and readily assembled and dismounted.

Further objects of the invention, not specifically enumerated above, will be apparent as it is described in greater detail in connection with the accompanying drawings, wherein:

Figure 1 is a plan view, partly broken away, showing a portion of a clutch, including a portion of a friction disk thereof, and a cooperating plate which engages therewith.

Figure 2 is a view in section, taken on line 2—2 of Figure 1 and looking in the direction of the arrows.

Figure 3 is a view in section, taken in a plane passing through the axis of the clutch, and showing a modified means for effecting smooth engagement of the relatively rotating members.

Figure 4 is a view in section, similar to Figure 3, showing the elements of Figure 3 in a disengaged position.

Figure 5 is a detailed view showing the spring plate used in the construction shown in Figures 3 and 4.

Figures 6, 7 and 8 are views similar to Figures 3, 4 and 5, showing a further modified construction.

Figures 9 and 10 are views similar to Figures 6 and 7, showing a still further modified construction in which the spring plate is dispensed with.

Referring to the above drawings, $a$ designates a clutch plate which, for simplicity of description, may constitute one of the relatively rotating elements of the clutch. Cooperating with this plate, is a friction disk $b$ which may be termed another of the relatively rotating clutch elements. The friction disk may be formed of an intermediate plate $b'$, upon either side of which friction disks $b^2$ are secured, as by means of rivets $b^3$. The disk $b$ and plate $a$ are co-axial and are adapted to be moved into engagement with each other by any means now commonly used for such purpose.

Within the plate $a$, recesses $a'$ are formed. These recesses are shown as spaced equidistant about the axis of the plate and receive spring fingers $c$. Rivets $c'$ may secure the spring fingers within the recesses $a'$ and the fingers are so formed that they project beyond the plane of the outer surface of the plate $a$. Suitable apertures $a^2$ are formed in the plate $a$ to permit the draining of fluid which might collect within the apertures $a'$.

From the foregoing description, it will be apparent that, when plate $a$ and disk $b$ are moved into engagement, spring fingers $c$ will first engage the disk $b$ and thus cause a gradually increasing drag between the relatively rotating elements, such drag eventually merging into the locking of such elements when the opposed surfaces thereof fully engage each other under the required pressure.

In the construction shown in Figures 3, 4 and 5, the plate $a$ is formed with an annular recess $d$. Within this recess an annular spring plate $e$ is seated, the periphery of the spring plate lying adjacent the outer periphery of the recesses. The inner periphery of the spring plate is preferably bowed, or sprung outwardly, as clearly shown in Figure 4, and the plate is slotted at $e'$ inwardly from the outer periphery and at $e^2$ outwardly from the inner periphery to render the plate more resilient. Recesses $d'$ communicate with conduits $d^2$ to effect the draining of the clutch in a manner similar to that described above.

In operation, it will be seen that the spring plate $e$ will first engage the friction disk $b$ adjacent its inner periphery when the disk $e$ and plate $a$ are moved into engagement. After this initial engagement, continued movement in such direction gradually increases the drag between the relatively rotating elements and eventually effects a smooth and positive engagement thereof.

In the construction shown in Figures 6, 7 and 8, a spring plate $f$ is secured to the plate $a$ by means of rivets $f'$. The plate $a$ is preferably formed with a shoulder $g$ which causes the inner periphery of the spring plate $f$ to be bowed outwardly as clearly shown in Figure 7. This results in the inner periphery of the spring plate $f$ being engaged with the disk $b$ initially, in a manner similar to that described in connection with the construction shown in Figures 3, 4 and 5. The spring plate $f$ is formed with slots $f^2$ extending outwardly from the inner periphery and pairs of slots $f^3$, extending inwardly from the outer periphery for the purpose described in connection with the slots shown in Figure 5.

In Figures 9 and 10, a smooth engagement between the relatively rotating elements is effected by the tapering of the outer face of the plate $a$ with respect to the cooperating face of the friction disk $b$. This tapering face is shown at $h$ and tapers away from the friction disk $b$, from the inner periphery of the plate $a$ toward the outer periphery. As the plate $a$ and disk $b$ are moved into engagement, the inner periphery of the plate $a$ will first engage the disk $b$ and further movement will cause a slight springing of the disk $b$ to cause the entire adjacent surface thereof to engage the cooperating surface of the plate $a$. During the movement above described, the engaging pressure, or friction between such elements is increased gradually until a positive engagement therebetween is effected. The recesses $d'$ and duct $d^2$ are likewise provided in this construction.

While the invention has been described with specific reference to the constructions shown in the accompanying drawings, it is not to be limited save as defined in the appended claims.

What I claim is:

1. A clutch construction comprising relatively rotating annular members, an annular spring member between the members having faces sloping with respect to the adjacent faces of the members to cause the surface of one of said members to engage the other of the members adjacent one periphery thereof initially in the movement of the members into engagement, and a cylindrical extension on the annular member adjacent its inner periphery.

2. A clutch construction comprising relatively rotating annular members, an annular spring member floating between the members having faces sloping with respect to the adjacent faces of the members to cause the surface of one of said members to engage the other of the members adjacent the inner periphery thereof initially in the movement of the members into engagement, and a cylindrical extension on the annular member adjacent its inner periphery.

This specification signed this 6th day of Sept., A. D. 1929.

BRUNO LOEFFLER.